(12) United States Patent
Gorsica et al.

(10) Patent No.: US 11,051,260 B2
(45) Date of Patent: Jun. 29, 2021

(54) ASYNCHRONOUS QUICK CONNECT FOR LOW-LATENCY TRANSITIONS OF CONTENT PRESENTATION BETWEEN TWO DEVICES

(71) Applicant: MOTOROLA MOBILITY LLC, Chicago, IL (US)

(72) Inventors: John J. Gorsica, Round Lake, IL (US); Michael E. Russell, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 114 days.

(21) Appl. No.: 16/241,323

(22) Filed: Jan. 7, 2019

(65) Prior Publication Data

US 2020/0221400 A1 Jul. 9, 2020

(51) Int. Cl.
*H04W 56/00* (2009.01)
*H04W 52/02* (2009.01)
*H04W 4/80* (2018.01)
*H04W 72/04* (2009.01)
*H04W 24/08* (2009.01)

(52) U.S. Cl.
CPC ........... *H04W 56/001* (2013.01); *H04W 4/80* (2018.02); *H04W 24/08* (2013.01); *H04W 52/0229* (2013.01); *H04W 72/0446* (2013.01); *H04W 72/0453* (2013.01)

(58) Field of Classification Search
CPC .............................. H04W 56/001; H04W 4/80
See application file for complete search history.

(56) References Cited

U.S. PATENT DOCUMENTS

| | | | | |
|---|---|---|---|---|
| 8,225,000 | B2* | 7/2012 | Xu | H04L 67/1095 370/503 |
| 9,854,506 | B2* | 12/2017 | Patil | H04W 56/0015 |
| 10,004,097 | B1* | 6/2018 | Somasandharam | H04W 76/19 |
| 10,045,181 | B2* | 8/2018 | Lee | H04W 4/80 |
| 10,333,525 | B1* | 6/2019 | Gandolfi | H03B 5/04 |
| 10,554,251 | B1* | 2/2020 | Chu | H04W 52/028 |
| 10,631,363 | B1* | 4/2020 | Xian | H04W 52/0251 |
| 2008/0165892 | A1* | 7/2008 | Yang | H04L 27/261 375/299 |
| 2011/0310842 | A1* | 12/2011 | Eisl | H04W 36/0072 370/331 |
| 2012/0115471 | A1* | 5/2012 | Awoniyi | H04W 52/0206 455/435.1 |

(Continued)

*Primary Examiner* — Parth Patel
(74) *Attorney, Agent, or Firm* — Isidore PLLC

(57) ABSTRACT

An electronic device, method, and computer program product provide an asynchronous quick connection or reconnection between wireless connecting devices for low-latency transitions in presentation of content to a user. A first device transmits an out-of-band frame sync signal to a second device to prompt the second device to synchronize clocks with the first device and to one of: (i) connect; and (ii) reconnect an over-the-air (OTA) communication session with the first device. First and second devices establish the OTA communication session. The establishment is expedited by the out-of-band frame sync signal. First device transmits output data, via the in-band OTA session, by the first device to the second device to present the output data on a second user output device of the second device.

20 Claims, 6 Drawing Sheets

(56) References Cited

U.S. PATENT DOCUMENTS

| | | | | |
|---|---|---|---|---|
| 2012/0131184 A1* | 5/2012 | Luna | ................. | H04W 28/14 |
| | | | | 709/224 |
| 2012/0236842 A1* | 9/2012 | De Foy | ................ | H04L 7/0008 |
| | | | | 370/350 |
| 2013/0036231 A1* | 2/2013 | Suumaki | ............ | H04W 12/003 |
| | | | | 709/228 |
| 2013/0223336 A1* | 8/2013 | Lindner | ................. | H04L 47/35 |
| | | | | 370/328 |
| 2013/0244653 A1* | 9/2013 | Song | ................. | H04W 56/001 |
| | | | | 455/436 |
| 2014/0146727 A1* | 5/2014 | Segev | ................. | H04W 76/14 |
| | | | | 370/311 |
| 2015/0249482 A1* | 9/2015 | Czaja | ................. | H04W 4/38 |
| | | | | 455/41.1 |
| 2016/0091959 A1* | 3/2016 | Barak | ................. | G06F 1/3287 |
| | | | | 713/320 |
| 2017/0181112 A1* | 6/2017 | Kuzmanovic | ........... | H04L 27/10 |
| 2017/0215213 A1* | 7/2017 | Lee | ........... | H04L 61/20 |
| 2017/0244576 A1* | 8/2017 | Batra | .............. | H04W 56/0025 |
| 2017/0353365 A1* | 12/2017 | Li | ........... | H04L 43/04 |
| 2018/0173326 A1* | 6/2018 | Mathias | ................ | G06F 3/017 |
| 2018/0191541 A1* | 7/2018 | Fang | ................. | H04W 74/006 |
| 2018/0198545 A1* | 7/2018 | Aichriedler | ........... | H04J 3/0652 |
| 2018/0262321 A1* | 9/2018 | Yan | ................ | H04L 7/0037 |
| 2019/0102143 A1* | 4/2019 | Kumar | ................ | H04L 1/0007 |
| 2019/0158654 A1* | 5/2019 | Way | ................ | H04W 4/50 |
| 2019/0373569 A1* | 12/2019 | Ram | ................ | H04B 7/024 |
| 2020/0084375 A1* | 3/2020 | Tadano | .............. | H04N 5/2256 |
| 2020/0137699 A1* | 4/2020 | Girardier | ............ | H04W 56/002 |
| 2020/0195300 A1* | 6/2020 | Zhang | ................ | H04B 1/7136 |

* cited by examiner

ASYNCHRONOUS QUICK CONNECT FOR LOW-LATENCY TRANSITIONS OF CONTENT PRESENTATION BETWEEN TWO DEVICES

BACKGROUND

1. Technical Field

The present disclosure relates generally to communication interfaces between devices, and more particularly to wirelessly connecting or reconnecting the devices.

2. Description of the Related Art

Mobile user devices, such as smart phones, are increasingly being utilized as multi-function personal assistants, providing communication, social media, navigational assistance, personal organization, and audiovisual entertainment. Many of these functions include presentation of output data as humanly-perceptible content, such as audio outputs. However, the mobile user devices tend to be small with minimal real estate for battery and audio speakers. The mobile user devices do not support a speaker on the device itself that has an audio output with adequate volume and quality for certain uses. Increasingly, portable speakers are used with mobile user devices as a substitute for using speakers integral to the mobile user devices.

Many of these portable speakers also include battery power in order to be mobile/portable. As battery powered devices, smart phones and portable speakers conserve power when not being actively in use by turning off radio frequency (RF) transceivers to significantly reduce power drain on the batteries. The wireless devices then periodically wake up to determine whether a wireless connection needs to be established. Generally-known Bluetooth connection establishment requires 1-3 seconds to complete. Following the connection, audio streaming takes an additional 200 ms from content selection to streaming of audio content. While the connection is being established, presentation of content is either delayed or an initial portion of the content is not presented at all. The period of transition latency during connection establishment degrades user experience.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
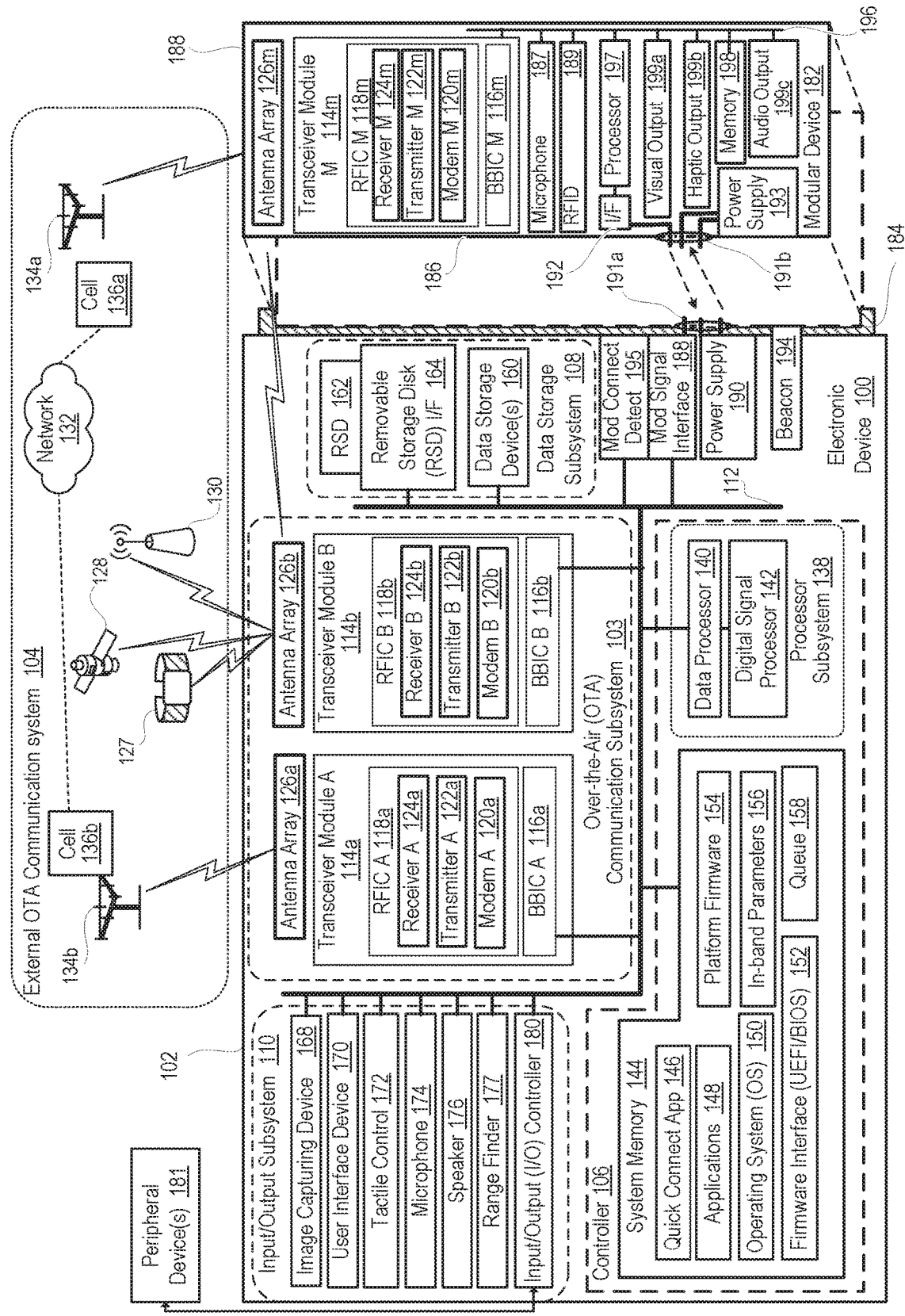
FIG. 1 is a simplified functional block diagram illustrating an example electronic device that enables asynchronous quick connection between wireless connecting devices, according to one or more embodiments.

According to aspects of the present disclosure, an electronic device, a computer program product, and a method provide an asynchronous quick connection between wireless connecting devices for low-latency transitions in presentation of content to a user. A first device transmits an out-of-band frame sync signal to a second device to prompt the second device to synchronize clocks with the first device and to one of: (i) connect; and (ii) reconnect an over-the-air (OTA) communication session with the first device. Reconnection includes waking up one or both devices after a period of sleeping for reduced power consumption. First and second devices establish the OTA communication session that is expedited by the out-of-band frame sync signal. First device transmits output data, via the in-band OTA session, by the first device to the second device to present the output data on a second user output device of the second device.

Bluetooth and Wi-Fi communication protocols in general support two options: (i) low latency with high current drain; or (ii) high latency with low current drain. As an example, generally-known Bluetooth R1 page scan is a state of a Bluetooth device that is waiting for incoming connection. Connection occurs in integer multiples of 1.28 seconds (s). Once connected in standby, the Bluetooth device performs a sniff procedure generally every 500 milliseconds (ms) to see if another device is prompting the Bluetooth device to wake up. This lengthy latency period is the generally-known trade-off for reducing battery drain. Instead of a sniff procedure, Bluetooth Low Energy (BLE) has a fixed connection interval that is set to a long duty cycle. Generally-known Wi-Fi devices have a beacon capability that is sent at predefined intervals, such as about each 100 ms. Beacons are used to maintain time synchronization in the network. According to IEEE 802.11 standard, stations in power save mode wake up at these intervals to listen for traffic from an access point with a default interval also being 100 ms. All of these generally-known OTA communication capabilities have a tradeoff between power conservation and latency of renewing a wireless communication connection that tends to be too long for maintaining user experience with audio playback on a remote standby device.

According to aspects of the present disclosure, mitigations are provided to currently available wireless connection capabilities to concurrently support both low current drain and low latency of data sent wirelessly after reconnection. Out-of-band communication, either via a wired or wireless channel, enables expedited reconnection of an in-band OTA communication channel. In one or more embodiments, the out-of-band communication channel expedites connection or reconnection of an in-band OTA communication channel. The in-band OTA communication channel establishes a connection with reduced transition latency to transmit output data between devices for presentation as content, such as audio content, for a user.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 is a simplified functional block diagram illustrating example electronic device 100 that enables asynchronous quick connection between wireless connecting devices for low-latency transitions in presentation of content on a second device. Electronic device 100 can be one of a host of different types of devices, including but not limited to, a mobile cellular phone or smart-phone, a laptop, a net-book, an ultra-book, a networked smart watch or networked sports/exercise watch, and/or a tablet computing device or similar device that can include wireless communication functionality. As a device supporting wireless communication, electronic device 100 can be one of, and also be referred to as, a system, device, subscriber unit, subscriber station, mobile station (MS), mobile, mobile device, remote station, remote terminal, user terminal, terminal, user agent, user device, cellular telephone, a satellite phone, a cordless telephone, a Session Initiation Protocol (SIP) phone, a wireless local loop (WLL) station, a personal digital assistant (PDA), a hand-held device having wireless connection capability, a computing device, or other processing devices connected to a wireless modem. These various devices all provide and/or include the necessary hardware and software to support the various wireless or wired communication functions as part of a communication system. Electronic device 100 can also be an over-the-air link in a communication system that can be intended to be portable or hand-held or for which a user can move into close proximity. Examples of such over-the-air (OTA) link electronic device 100 include a wireless modem, an access point, a repeater, a wirelessly-enabled kiosk or appliance, a femtocell, a small coverage area node, and a wireless sensor, etc.

Referring now to the specific component makeup and the associated functionality of the presented components, in one or more embodiments, electronic device 100 includes functionality that is provided by components internal to a device housing 102. In one or more particular embodiments, electronic device 100 operates as a communication device via OTA communication subsystem 103 that communicates with external OTA communication system 104. To support OTA communications and other functions, electronic device 100 includes controller 106, data storage subsystem 108, and input/output (I/O) subsystem 110 that are communicatively coupled and interconnected to each other via a system interlink 112.

OTA communication subsystem 103 includes transceiver modules A and B 114*a-b*. Transceiver modules A and B 114*a-b* respectively include baseband integrated circuit (BBIC) A and B 116*a-b* and radio frequency integrated circuit (RFIC) A and B 118*a-b*. RFICs A and B 118*a-b* include respective modems A and B 120*a-b*, RF transmitters A and B 122*a-b*, and RF receivers A and B 124*a-b*. BBICs A and B 116*a-b* are communicatively coupled via interlink 112 to controller 106 and to respective RFICs A and B 118*a-b* to function as communication modules. BBICs A and B 116*a-b* encode transmit data from controller 106 into a selected OTA communication protocol for transmission by RFICs A and B 118*a-b* via respective antenna arrays 126*a-b*. BBICs A and B 116*a-b* decode received data from corresponding RFICs A and B 118*a-b* from the OTA communication protocol into a format used by controller 106.

Within corresponding RFICs A and B 118*a-b*, modems A and B 120*a-b* modulate baseband encoded data from BBICs A and B 116*a-b* onto a carrier signal. The resulting transmit signal is amplified and frequency filtered by corresponding transmitter A and B 122*a-b* and output via antenna arrays 126*a-b*. Signals received by antenna array 126*a* are amplified and frequency filtered by receiver A 124*a*, and modem A 120*a* demodulates a data signal from the carrier signal. BBIC A 116*a* decodes the data signal. Signals received by antenna array 126*b* are amplified and frequency filtered by receiver B 124*b*, and modem B 120*b* demodulates a data signal from the carrier signal. BBIC B 116*b* decodes the data signal.

Controller 106 controls the communication, user interface, and other functions and/or operations of electronic device 100. These functions and/or operations include, but are not limited to including, application data processing and signal processing. Electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard wired logic. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections are illustrated in FIG. 1, it is to be understood that more, fewer, or different interconnections may be present in other embodiments.

In one or more embodiments, controller 106, via OTA communication subsystem 103, can perform multiple types of OTA communications with external OTA communication system 104. OTA communication subsystem 103 can communicate with one or more of a personal access network (PAN) devices, such as smart watch 127, via a Bluetooth wireless link, global positioning system (GPS) satellite 128, and node 130 of a wireless local access network (WLAN). WLAN node 130 is connected to a wide area network 132, such as the Internet. OTA communication subsystem 103 can also communicate with one of radio access networks (RANs) 134*a-b* having respective base stations (BSs) or cells 136*a-b*. RANs 134*a-b* are a part of a wireless wide area network (WWAN) that is connected to network 132 and provides data and voice services.

Controller 106 includes processor subsystem 138 that executes program code to provide functionality of the electronic device 100. Processor subsystem 138 includes one or more central processing units (CPUs) ("data processor") 140. Processing subsystem 138 includes a digital signal processor (DSP) 142. Controller 106 includes system memory 144 for containing actively used program code and data. System memory 144 can include therein a plurality of such program code and modules, including applications such as quick connect application ("app") 146 and other applications 148. System memory 144 can also include operating system (OS) 150, firmware interface 152 such as basic input/output system (BIOS) or uniform extensible firmware interface (UEFI), and platform firmware (FW) 154. These software and/or firmware modules have varying functionality when their corresponding program code is executed by processor subsystem 138 or secondary processing devices within electronic device 100. Data, such as in-band parameters 156 and queue 158 for output data, is stored in system memory 144.

Data storage subsystem 108 provides nonvolatile storage, accessible to controller 106. For example data storage subsystem 108 can provide a large selection of applications 148 that can be loaded into system memory 144. Local data storage device(s) 160 can include hard disk drives (HDDs), optical disk drives, solid state drives (SSDs), etc. In one or more embodiments, removable storage device (RSD) 162 that is received in RSD interface (I/F) 164 is a computer readable storage device, which can be referred to as non-transitory. RSD 162 is an example of a computer program product that can be accessed by controller 106 to provision electronic device 100 with program code. The program code, when executed by controller 106, provides the functionality to electronic device 100 to perform aspects of the present innovation described herein.

I/O subsystem 110 provides input and output devices, which can be utilized for presenting output data or receiving input data. For example, image capturing device 168, such as a camera, can receive gestures and other image data. User interface device 170 can present visual or tactile outputs as well as receive user inputs. Tactile/haptic control 172 can provide an interface such as for braille reading or manual inputs. Microphone 174 receives audible inputs. Audio speaker 176 can provide audio output, including audio playback and alerts. Range finder 177 can emit a waveform of energy, such as acoustic, infrared, radio frequency (RF), etc., whose time of flight is used to measure distance to a reflecting object. I/O subsystem 110 can be wholly or substantially encompassed by device housing 102 or be connected via I/O controller 180 as peripheral device 181. I/O controller 180 can also interface with wired local access network (LAN).

According to aspects of the present disclosure, electronic device 100, as a first device, can asynchronously quick connect with low latency transitions to a second electronic device. In one or more embodiments, the second electronic device is a modular ("mod") device 182 that augments capabilities and functionalities of electronic device 100. Examples of mod devices include a stereo loud speaker, a display projector, a mobile printer, a voice commanded smart speaker, a gamepad, a style shell, a 360° camera, a power pack, a camera with optical zoom, a wireless charging shell, a custom developed mod, a fifth generation (5G) cellular data communication modem, etc. In one embodiment, housing 102 of electronic device 100 includes mounting surface 184 that is shaped to conform to and engage with mod housing 186 of mod device 182. Mod signal interface 188 and power supply 190 of electronic device 100 provide communication and power via first 3-contact connector 191*a* respectively through mounting surface 184 to corresponding second 3-contact connector 191*b* of mod device 182.

In one or more embodiments, mod device 182 includes RF transceiver M 114*m* that enables high bandwidth (in-band) communication with electronic device 100. In the illustrative embodiment, mod device 182 includes later generation communication capabilities, such as RF transceiver M 114*m* that communicates with smart watch 127, node 130, and cells 136*a-b*.

In one or more embodiments, magnets embedded in mod device 182 are attracted to ferrous material of housing 102 to create engagement between electronic device 100 and mod device 182. When mod device 182 is physically engaged to primary electronic device 102, mod signal interface 188 of electronic device 100 is communicatively coupled to interface 192 of mod device 182 for low bandwidth (out-of-band) communication for asynchronous quick connections. Physical engagement can also provide an opportunity for power supply 190 of electronic device 100 to electrically couple to power supply 193 of mod device 182. First and second 3-contact connectors 191*a-b* transfer battery charge to mod device 182. In one or more embodiments, the number of contacts can be less. For example, a communication signal can be carried on one, or differentially across both, DC power and ground voltages conducted via a two-contact connector. For another example, a two-contact connector can carry an out-of-band communication signal without transferring power. In one or more embodiments, a connector can include more than 3 contacts or conductors.

In one or more embodiments, after separation of mod device 182 from electronic device 100, a beacon 194 of electronic device can provide an asynchronous frame sync signal to mod device 182. Beacon 194 can utilize an OTA communication channel that requires a low amount of power to transmit by electronic device 100 and to receive by mod device 182. Mod device 182 has high current drain RF transceiver M 114*m* in a sleep state for power conservation and has a portion of the mod device 182 that remains awake and active to receive an asynchronous frame sync signal.

For an asynchronous frame sync signal sent via OTA communication, a predefined delay can exist for a time when mod device 182 wakes up to receive a communication. The predefined delay for electronic device 100 waits for mod device 182 to be listening can be avoided by using a different mode of transmitting the asynchronous frame sync signal. In one or more embodiments, beacon 194 utilizes speaker 176 to output an acoustic signal that is above the acoustic frequency capability of the human ear. Mod device 182 receives the acoustic signal via microphone 187. In one or more embodiments, beacon 194 can be an infrared (IR) emitter that is detectable by a low power IR sensor that remains active when RF transceiver M 144*m* is asleep. In an additional embodiment, beacon 194 can maintain encoding information for a radio frequency identifier (RFID) 189 in mod device 182. Beacon 194 transmits an encoded interrogation signal that activates RFID 189 that then triggers processor 197. Mod connect detect sensor 195 of electronic device 100 can determine whether or not mod device 182 is physically and electrically coupled to electronic device 100.

Mod device 182 has transceiver module M 114*m* that includes BBIC M 116*m* and RFIC M 118*m*. RFIC M 118*m* includes modem M 120*m*, RF transmitter M 122*m*, and RF receiver M 124*m*. BBIC M 116*m* is communicatively coupled via interlink 196 to processor 197 that utilizes memory 198 and to RFIC M 118*m* to function as a communication module. BBIC M 116*m* encodes transmit data from processor 197 into a selected OTA communication protocol for transmission by RFIC M 118*m* via antenna array 126*m*. BBIC M 116*m* decodes received data from RFIC M 118*m* from the OTA communication protocol into a format used by processor 197. Within RFIC M 118*m*, modem M 120*m* modulates baseband encoded data from BBIC M 116*m* onto a carrier signal. The resulting transmit signal is amplified and frequency filtered by transmitter M 122*m* and output via antenna array 126*m*. Signals received by antenna array 126*m* are amplified and frequency filtered by receiver M 124*m*, and modem M 120*m* demodulates a data signal from the carrier signal. BBIC M 116*m* decodes the data signal.

Electronic device 100 then transmits using in-band OTA communication to mod device 182. According to aspects of the present disclosure, mod device 182 includes one or more output devices 199*a-c* that augment user output capabilities of electronic device 100. In one or more embodiments, mod device 182 includes visual output device 199*a*, haptic output device 199*b*, and audio output device 199*c*. Electronic device 100 and mod device 182 maintain low current drain during lengthy periods of being asleep by turning off respectively high current devices such as RF transceivers A and B 114*a-b*, and RF transceiver M 114*m*. Electronic device 100 can send output data to mod device 182 after an asynchronous quick connect procedure. The asynchronous quick connect procedure enables playing of output data such as audio content with low-latency transitions from electronic device 100 to mod device 182. For clarity, the presentation of humanly-perceptible content with low latency transitions of transmitting output data is described as going from Electronic device 100 to mod device 182. In one or more embodiments, content can be transferred bi-directionally with output data originating on mod device 100 that is presented on electronic device 100 as humanly-perceptible content.

In one or more embodiments, electronic device 100 connects to mod device 182 via the in-band connection by setting up Bluetooth communication using a modified and expedited paging process between electronic device 100 and mod device 182. The asynchronous frame sync signal triggers an immediate connection or wakeup, avoiding use of an OTA mechanism for clock synchronization and thus shortens the period of latency. By using an out-of-band frame sync signal, electronic device 100 synchronizes wake-ups, clocks, phase, and hop frequencies to speed up the paging process, which reduces latency of the connection for in-band communication.

In one or more embodiments, electronic device 100 connects to mod device 182 via the in-band connection by setting up Bluetooth communication using a sniff mode in a connected state between electronic device 100 and mod device 182. Active and Sniff modes are Bluetooth connected state with another device. The connection is referred to as a connection link or merely link. Active mode is the regular connected in which the device is actively transmitting or receiving data. Sniff mode is a power-saving mode of that is less active than Active mode. Sniff mode includes period of sleep with listening for transmissions at a set interval (e.g. every 100 ms). According to one aspect of the disclosure, the Bluetooth power save (sniff/unsniff) procedure for link wakeup is modified to allow immediate wake-ups. Electronic device 100 sends an out-of-band asynchronous frame sync signal for mod device 182 that is in Bluetooth sniff mode that enables a lower power state. Mod device 182 listens at predetermined intervals to check for messages to bring the connection link up to a higher power state to receive streaming output data from the connected device. In a conventional application that does not implement the features described herein, electronic device 100 and mod device 182 can each go into a dormant state for 500 ms before listening again to see if a wake-up is necessary to resume the low-latency link. According to aspects of the present disclosure, rather than waiting for intervals of 500 ms to elapse, out-of-band asynchronous frame sync signal can be sent from electronic device 100 to mod device 182 to change link timing.

In one or more embodiments, electronic device 100 connects to mod device 182 via the in-band connection. Connecting via the in-band connection involves setting up Bluetooth Low Energy communication between electronic device 100 and mod device 182. Bluetooth Low Energy connection update procedure is modified through the out-of-band communication to expedite wake-up. Electronic device 100 can also transmit the out-of-band asynchronous frame sync signal to include a connection update message to change link timing.

In one or more embodiments, electronic device 100 connects to mod device 182 via the in-band connection by setting up Wi-Fi Peer-to-Peer (P2P) communication between electronic device 100 and mod device 182. Wi-Fi P2P normally has a scanning, listening, and searching phase to begin a connection process. The Wi-Fi association procedure is modified to skip probes and channel searches, reducing latency. Electronic device 100 transmits an out-of-band asynchronous frame sync signal to immediately align clocks and frequencies of scanning phase on a known channel and time so that probe requests may be skipped, enabling service discovery and group formation phases to begin immediately.

In one or more embodiments, electronic device 100 connects to mod device 182 by setting up Wi-Fi communication between electronic device 100 and mod device 182. The present disclosure includes modifying Wi-Fi association to skip probes and channel searches. In one or more embodiments, electronic device 100 connects to mod device 182 via expedited Wi-Fi communication. The present disclosure provides a modified asynchronous delivery traffic indication map (DTIM) for Wi-Fi link wake-up, allowing immediate wake-ups.

In one or more embodiments, for initial connection creation aspect, electronic device 100 and mod device 182 make physical contact via power, ground, and input/output (I/O) contacts of first and second 3-contact connectors 191*a-b*. Upon detection and completion of the physical connection event, electronic device 100 sends an asynchronous pulse across at least the I/O contact to start a wireless connection. Upon reception of the asynchronous pulse, mod device 182 wakes up transceiver module M 114*m*, synchronizes time, and tunes to a preset frequency and connection parameters for a quicker connection. In one or more embodiments, the asynchronous pulse is encoded with variable timing, frequency, and connection parameters for connection between electronic device 100 and mod device 182. Upon completion of the wireless connection event, electronic device 100 and mod device 182 lower transmit (TX) power to a value preset for closely coupled devices awaiting a wake event.

While in the low power state, electronic device 100 has output data that is placed in queue 158 and that is to be transmitted from electronic device 100 to mod device 182. In response to detecting queuing of output data, electronic device 100 sends an asynchronous pulse with appropriate delay as necessary to coincide with a next opportunity to be received by mod device 182. In one or more embodiments, out-of-band communication is transmitted OTA. Mod device 182 turns on at least one RF receiver A and B 124*a-b*, to listen for control data for prompting wake-up. Some delay in sending the asynchronous pulse for prompting mod device 182 occurs to coincide with a time when the receiver will be on to listen. Reduction in latency is achieved by expediting the connection between electronic device 100 to mod device 182. In one or more embodiments, the out-of-band communication is on a dedicated hardwire connection that occurs without a delay. In one or more embodiments, the out-of-band communication is on an OTA communication channel that remains active, such as beacon 194 according to one or more embodiments described above. The asynchronous pulse triggers both electronic device 100 and mod device 182 to immediately wake up, re-align a low power RF timing anchor point, and resume standard wireless communication. Upon completion of sending the output data that is contained in queue 158, both electronic device 100 and mod device 182 re-enter a low power state. Connection latency is reduced by using the asynchronous pulse for initial connection setup. In particular, connection latency is reduced by bypassing RF scans, frequency searches, and timing alignment. Variable discontinuous transmit and receiving (TX/RX) communication has reduced latency for improved user experience on power conserving wireless devices (electronic device 100 and mod device 182). The communication is discontinuous in that output data is not continuously present, which creates opportunities for power conservation by electronic device 100 and mod device 182.

Figure 2:
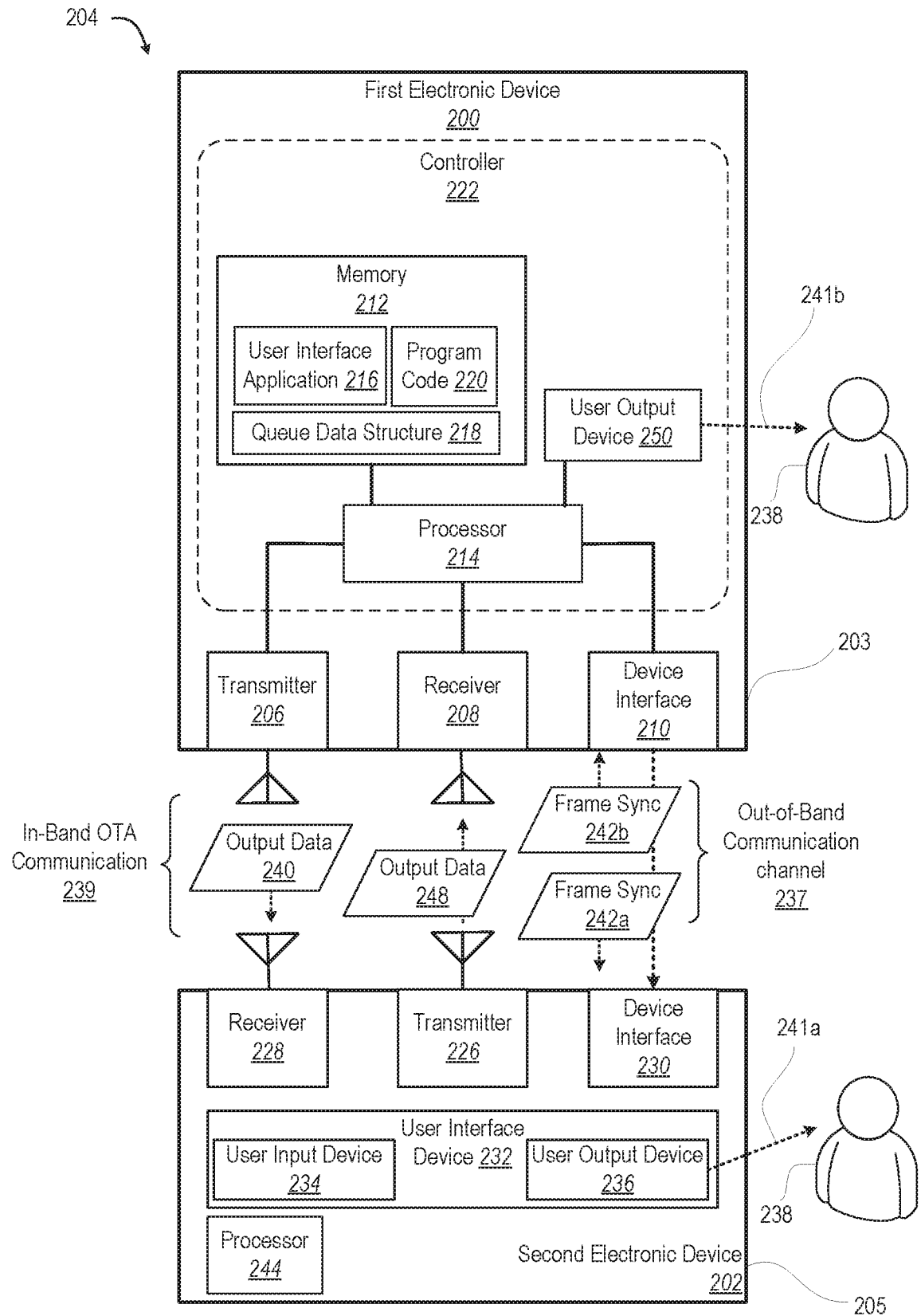
FIG. 2 is a simplified diagram of example first and second electronic devices that operate as a discontinuous transmit/receive (TX/RX) communication system, according to one or more embodiments.

FIG. 2 is a simplified diagram of example first and second electronic devices 200, 202 that operate as discontinuous TX/RX communication system 204. Electronic device and mod device 182 (FIG. 1) are example implementations of first and second electronic devices 200, 202. First and second electronic devices 200, 202 are provided with respective device housings 203, 205. First electronic device 200 includes transmitter 206, receiver 208, device interface 210, memory 212, and processor 214. Memory 212 contains user interface application 216, queue 218, and program code 220. Controller 222 includes processor 214 that is communicatively coupled to memory 212. Second electronic device 202 includes transmitter 226, receiver 228, device interface 230, and user interface device 232, which includes user input device 234 and user output device 236.

In one or more embodiments, device interfaces 210, 230 of respective first and second electronic devices 200, 202 enable asynchronous transmission over out-of-band communication channel 237 when in-band communication channel 239 is inactive. One or both of first and second electronic devices 200, 202 power down respective transmitters 206, 226 and receivers 208, 228 for power conservation. Second electronic device 202 maintains device interface 230 in an activate status to receive an out-of-band communication from first electronic device 200. For example, out-of-band communication channel 237 can be a twisted pair of wires that amplitude modulate a communication signal on a direct current (DC) power and ground voltages between first and second electronic devices 200, 202. For another example, out-of-band communication channel 237 can be an acoustic air channel for carrying an encoded audio output from first electronic device 200 to second electronic device 202. For an additional example, out-of-band communication channel 237 can be an RF interrogation signal transmitted from first device interface 210 of first electronic device 200 to second device interface 230 of second electronic device 202. Second device interface 230 can be inactive until powered by an encoded RFID interrogation signal. For yet another example, communication channel 237 can be an encoded infrared (IR) signal ransmitted from first device interface 210 of first electronic device 200 to second device interface 230 of second electronic device 202.

Processor 214 of controller 222 executes program code 220 to enable electronic device 200 to provide functionality according to the present disclosure. The functionality includes monitoring, by controller 222, for output data 240 present in queue 218. Output data 240 is selected for presentation on user output device 236 of second electronic device 202 as human-perceptible content 241*a* to user 238. In response to determining that output data 240 from user interface application 216 is present in the queue 218, first electronic device 200 transmits frame sync signal 242*a* over out-of-band communication channel 237. Second electronic device 202 is prompted to wake up and to synchronize time with first electronic device 200, in response to receiving frame sync signal 242*a*. First and second electronic devices 200, 202 connect, via in-band OTA communication channel 239 using either preset and coordinated timing, frequency, and connection parameters or such information encoded in frame sync signal 242*a*. First electronic device 200 transmits output data 240 via the in-band communication channel 239 between transmitter 206 and receiver 228. Second electronic device 202 presents output data 240 on user output device 236.

Presentation of content can be bi-directional between first and second electronic devices 200, 202. The functionality includes monitoring, by processor 244 of second electronic device 202, for output data 248 that is selected for presentation on user output device 250 of first electronic device 200 as human-perceptible content 241*b* to user 238. Second electronic device 200 transmits frame sync signal 242*b* over out-of-band communication channel 237. In response to receiving frame sync signal 242*b*, first electronic device 200 is prompted to wake up and to synchronize time with second electronic device 202, First and second electronic devices 200, 202 connect, via in-band OTA communication channel 239 using either preset and coordinated timing, frequency, and connection parameters or such information encoded in frame sync signal 242*b*. Second electronic device 202 transmits output data 248 via the in-band communication channel 239 between transmitter 226 and receiver 208. First electronic device 202 presents output data 248 on user output device 250.

Figure 3A:
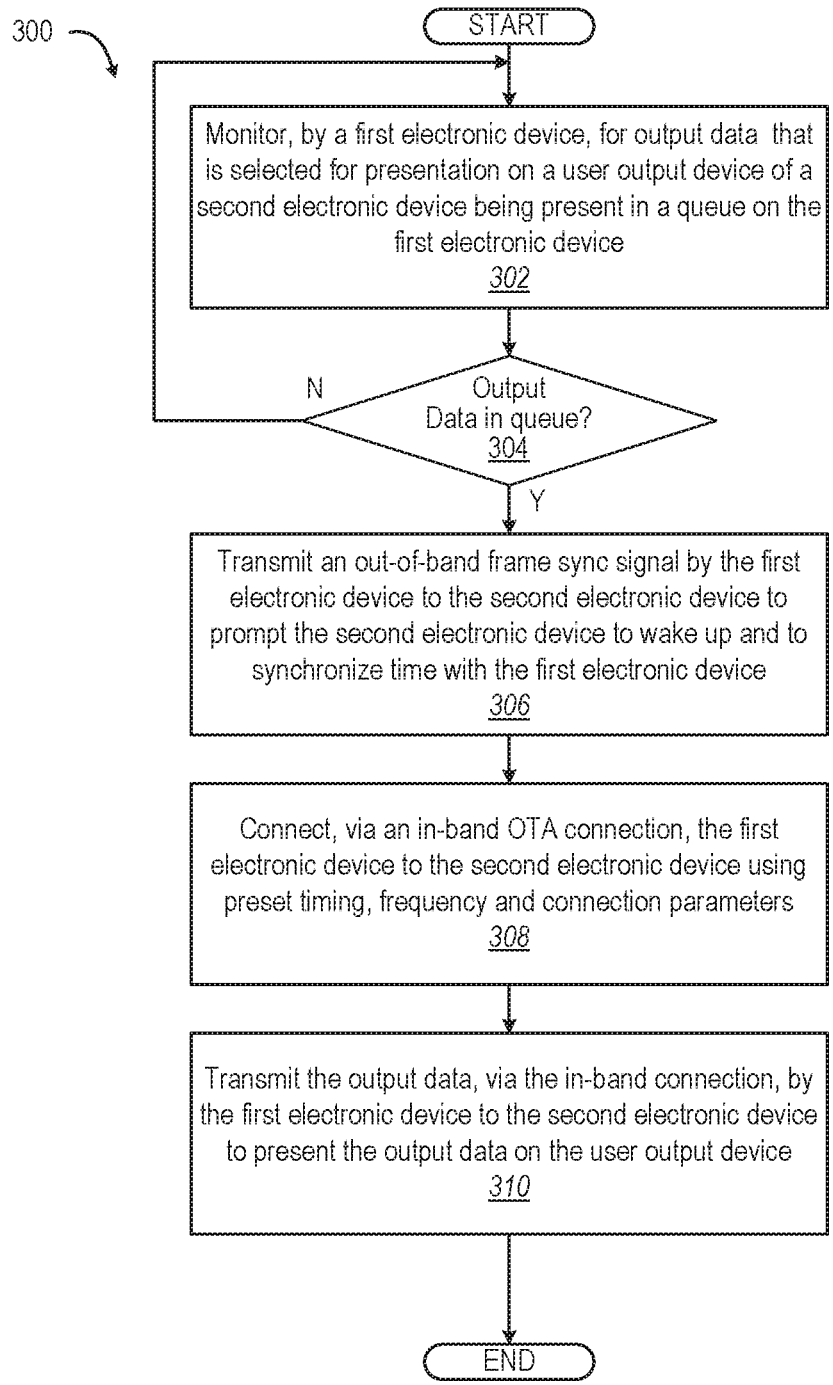
FIG. 3A is a flow diagram illustrating an example method for asynchronous quick connection between wireless connecting devices, according to one or more embodiments.

FIG. 3A is a flow diagram illustrating an example method 300 for asynchronous quick connection between wireless connecting devices for low-latency transitions in presentation of content to a user. In one or more embodiments, method 300 includes monitoring, by first electronic device 200 (FIG. 2), for output data that is received in a queue 218 (FIG. 2) on the first electronic device 200 (FIG. 2). The output data is selected for presentation on a user output device 236 (FIG. 2) of second electronic device 202 (FIG. 2) (block 302). A determination is made whether output data is present in the queue 218 (FIG. 2) (block 304). In response to determining that output data is not present, method 300 returns to block 302. In response to determining that output data is present in the queue, method 300 includes transmitting an out-of-band frame sync signal by the first electronic device to the second electronic device to prompt the second electronic device to wake up and to synchronize time with the first electronic device (block 306). Method 300 includes connecting, via an in-band connection, the first electronic device to the second electronic device using preset timing, frequency, and connection parameters (block 308). Method 300 includes transmitting the output data, via the in-band connection, by the first electronic device to the second electronic device to present the output data on the user output device (block 310). Then method 300

Figure 3B:
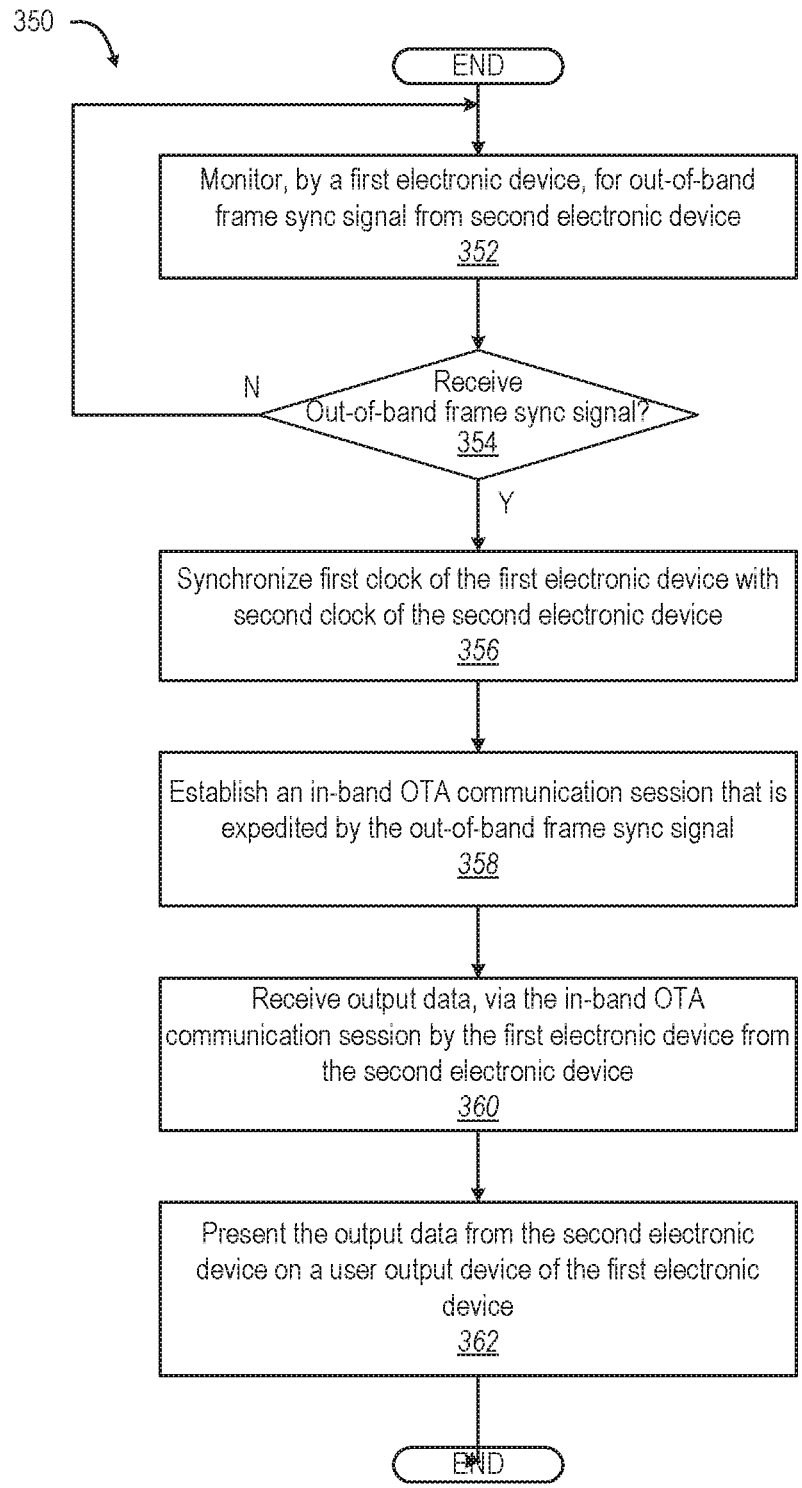
FIG. 3B is a flow diagram illustrating an example method for asynchronous quick connection for bi-directional presentation of content, according to one or more embodiments.

FIG. 3B is a flow diagram illustrating an example method 350 for asynchronous quick connection between wireless connecting devices for low-latency transitions in bi-directional presentation of content to a user. Method 300 can be performed in parallel to method 300 of FIG. 3A. In one or more embodiments, method 350 includes monitoring, by the first electronic device 200 (FIG. 2), for an out-of-band frame sync signal that is received from the second electronic device (block 352). A determination is made whether the first electronic device has received an out-of-band frame sync signal from the second electronic device (decision block 354). In response to determining that an out-of-band frame sync signal is received from the second electronic device, method 350 includes synchronizing the first clock of the first electronic device to the second clock of the second electronic device (block 356). Method 350 includes establishing an in-band OTA communication session between the first and second electronic devices that is expedited by the out-of-band frame sync signal (block 358). Method 350 includes receiving output data, via the in-band OTA communication session, by the first electronic device from the second electronic device (block 360). Method 350 includes presenting the output data from the second electronic device on a user output device 250 of the first electronic device 200 (FIG. 2) (block 362). Then method 350 ends.

Figure 4A:
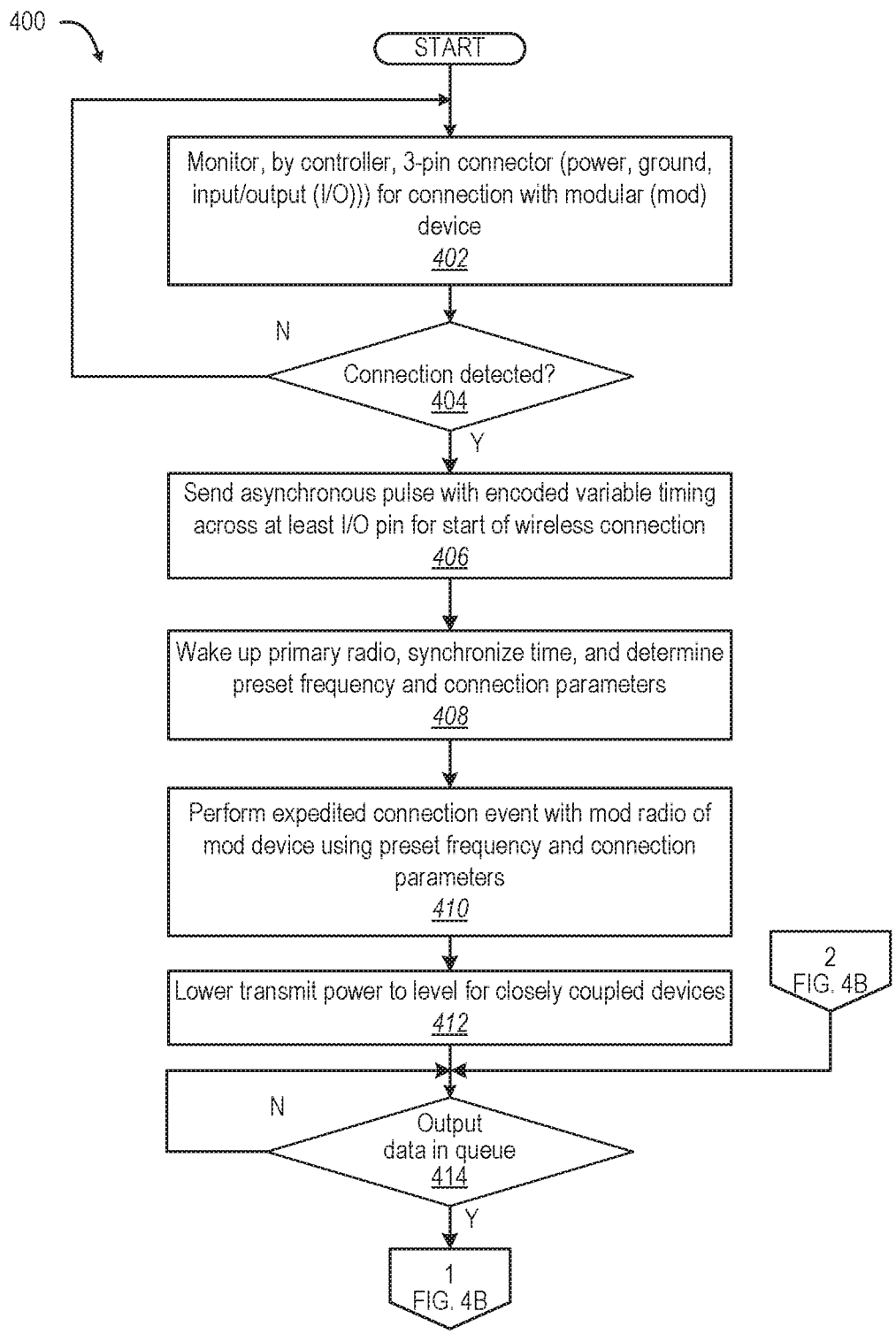
FIGS. 4A-B are a flow diagram illustrating an example method for discontinuous TX/RX communication with reduced start-up latency, according to one or more embodiments.
Figure 4B:
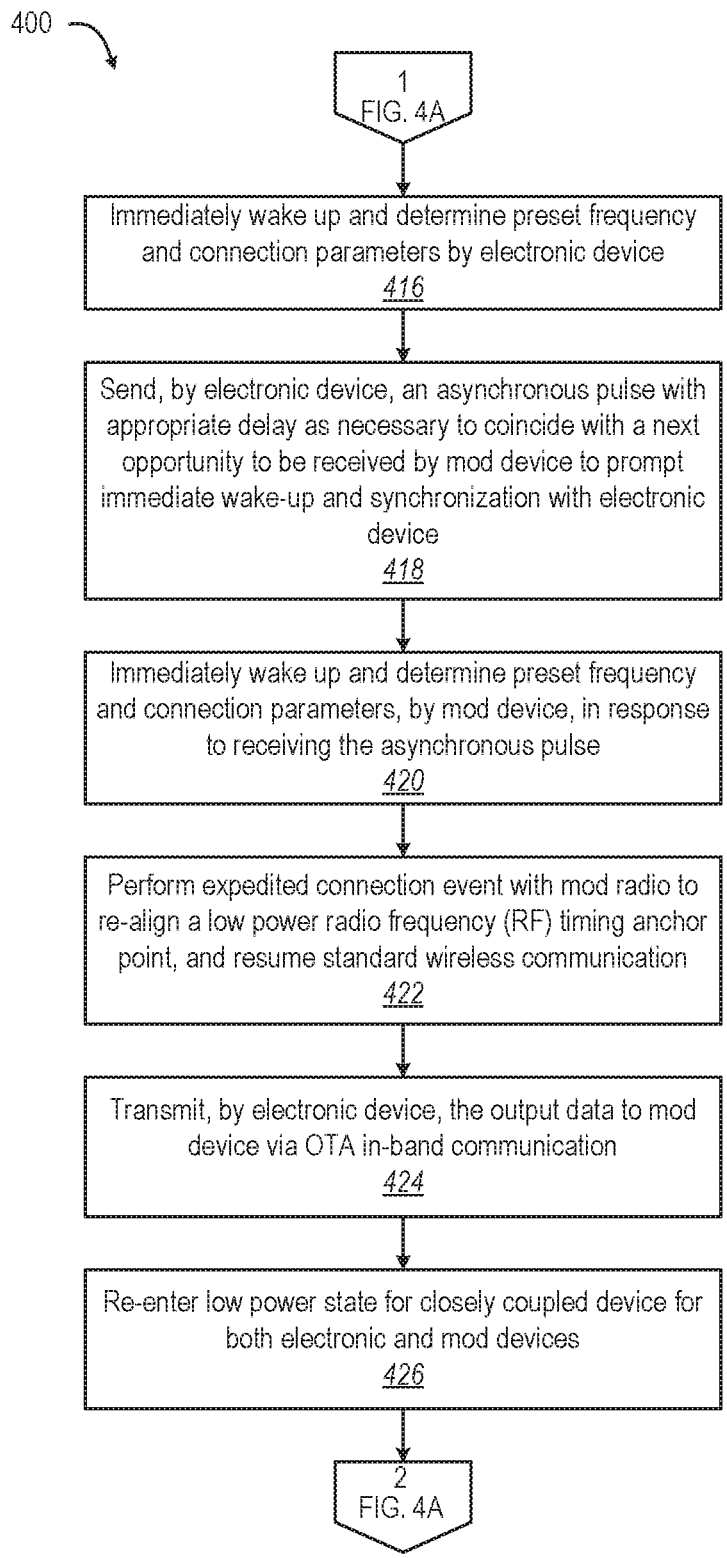

FIGS. 4A-4B provides a flow diagram illustrating example method 400 for discontinuous TX/RX communication with reduced start-up latency. With initial reference to FIG. 4A, method 400 includes monitoring, by controller 106 (FIG. 1), for electronic device 100 and mod device 182 (FIG. 1) to make physical contact via power, ground, and input/output (I/O) contacts of first and second 3-contact connectors 191*a*-*b* (FIG. 1) (block 402). In one or more embodiments, this physical contact between electronic device 100 and mod device 182 (FIG. 1) initiates creation of a communication connection. A determination is made by controller 106 (FIG. 1) whether connection is detected (decision block 404). In response to determining that connection is not detected, method 400 returns to block 402. In response to determining that connection is detected, method 400 includes sending an asynchronous pulse across at least the I/O pin contact to start a wireless connection, which can include encoded variable timing, frequency and connection parameters (block 406). Upon receipt of the asynchronous pulse, method 400 includes waking up primary radio (transceiver module M 114*m*) of mod device 182 (FIG. 1), synchronizing time, and determining preset frequency and connection parameters for a quicker connection (block 408). In one or more embodiments, the asynchronous pulse is encoded with variable timing, frequency, and connection parameters for connection. In one or more embodiments, electronic and mod devices are pre-provisioned with timing, frequency, and connection parameters for expedited connection without additional setup steps. Method 400 includes performing expedited connection event using preset frequency and connection parameters (block 410). Upon completion of the wireless connection event, method 400 includes lowering transmit (TX) power by electronic device 100 and mod device 182 to a value preset for closely coupled devices awaiting a wake-up event (block 412). While in the low power state, method includes determining, by electronic device 100 (FIG. 1), whether output data that is to be transmitted from electronic device 100 to mod device 182 (FIG. 1) has entered into queue 158 (decision block 414). In response to determining that output data has not entered into the queue, method 400 returns to block 414.

With reference to FIG. 4B, in response to determining that output data has entered into the queue, method 400 includes immediately waking up and determining preset frequency and connection parameters by electronic device (block 416). Method 400 includes sending, by electronic device, an asynchronous pulse with appropriate delay as necessary to coincide with a next opportunity to be received by mod device (block 418). Method 400 includes immediately waking up and determining preset frequency and connection parameters, by mod device, in response to the asynchronous pulse (block 420). Method 400 includes performing expedited connection event with mod radio (transceiver module M 114*m* (FIG. 1)) to re-align a low power RF timing anchor point and resume standard wireless communication (block 422). Method 400 includes transmitting, by electronic device 100, the output data to mod device via OTA in-band communication (block 424). Upon completion of sending the output data in queue 158, method 400 includes re-entering low power state for closely coupled devices for both electronic device 100 and mod device 182 (FIG. 1) (block 426). By using the synchronous pulse for initial connection setup, connection latency is reduced by bypassing RF scans, frequency searches, and timing alignment. Variable discontinuous transmit and receiving (TX/RX) communication is enabled with improved user experience on power conserving wireless devices (electronic device 100 and mod device 182). In one or more embodiments, an in-band communication channel can be used that allows mod device 182 to continuously monitor in-band communication channel without incurring significant current drain because RF transceiving capabilities are asleep. Then method 400 returns to decision block 414 (FIG. 4A).

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiment(s) described above was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
    comparing, by the first device, a time threshold to an amount of time that has elapsed since the respective first and second clocks of the first and second device were synchronized;
    in response to determining that the amount of elapsed time exceeds the time threshold, transmitting an out-of-band frame sync signal by a first device to a second device to prompt the second device to synchronize a second clock of the second device with a first clock of the first device and to one of: (i) connect; and (ii) reconnect an in-band over-the-air (OTA) communication session between the second device and the first device, the out-of-band frame sync signal enabling faster connection/reconnection than a set interval of a Bluetooth (BT) sniff mode;
    establishing the in-band OTA communication session between the second device and the first device, a timing for establishing the in-band OTA communication session expedited by the out-of-band frame sync signal; and
    transmitting output data, via the in-band OTA session, by the first device to the second device to present the output data on a second user output device of the second device.

2. The method of claim 1, wherein the transmitting of the out-of band signal is completed via a physical communication channel between the first and second device.

3. The method of claim 2, further comprising:
    determining, by the first and second devices, whether a trigger event has occurred, the trigger event being a status of the physical communication channel between the first and second devices having changed from connected to disconnected; and
    in response to determining that the trigger event has occurred, synchronizing, by the first and second devices, the respective first and second clocks based on the triggering event.

4. The method of claim 1,
    wherein the transmitting of the out-of-band frame sync signal over an OTA communication channel is performed to: (i) wake up the second device; (ii) prompt the second device to reconnect with the first device; and (iii) synchronize time with the first device for reduced latency in transmitting output data that will be subsequently received in a queue.

5. The method of claim 1, further comprising:
monitoring, by the first device, for the output data present in a queue on the first device, the output data being selected for presentation on the output device of the second device;
in response to determining that the output data is present in a queue, transmitting the out-of-band frame sync signal by the first device to the second device to prompt the second device to wake up and to synchronize time with the first device; and
reconnecting, via the in-band OTA communication session, the first device to the second device.

6. The method of claim 1, further comprising encoding, by the first device, preset timing, frequency and connection parameters with the asynchronous frame sync signal during wireless connection between the first and second devices.

7. The method of claim 1, further comprising provisioning the first and second devices with preset timing, frequency and connection parameters for wireless connection between the first and second devices with reduced connection latency.

8. The method of claim 1, further comprising:
receiving, by the first device, an out-of-band frame sync signal from the second device;
synchronizing the first clock of the first device to the second device in response to receiving the out-of-band frame sync signal from the second device;
establishing a second in-band OTA communication session that is expedited by the out-of-band frame sync signal; and
receiving output data, via the in-band OTA communication session, by the first device from the second device; and
presenting the output data from the second device on a first user output device of the first device.

9. An electronic device comprising:
a transmitter;
a receiver;
a first clock
a device interface communicatively coupled to a second device;
a memory having a user interface application and a queue for containing output data;
a controller comprising a processor communicatively coupled to the transmitter, the memory, and the device interface, the processor executing program code to enable the electronic device to:
compare a time threshold to an amount of time elapsed since the respective first and second clocks of the first and second device were synchronized;
in response to determining that the amount of elapsed time exceeds the time threshold, transmit an out-of-band frame sync signal by the device interface to the second device to prompt the second device to synchronize a second clock of the second device with the first clock of the electronic device and to one of: (i) connect; and (ii) reconnect an in-band over-the-air (OTA) communication session between the second device and the electronic device, the out-of-band frame sync signal enabling faster connection/reconnection than a set interval of a Bluetooth (BT) sniff mode;
establish the in-band OTA communication session between the second device and the first device, a timing for establishing the in-band OTA communication session expedited by the out-of-band frame sync signal; and
transmit output data, via the in-band OTA session, by the transmitter to the second device to present the output data on a second user output device of the second device.

10. The electronic device of claim 9, wherein the controller enables the electronic device to transmit the out-of-band frame sync signal via the physical communication channel between the device interface and the second device.

11. The electronic device of claim 10, wherein the controller enables the electronic device to:
determine whether a trigger event has occurred, the trigger event being a status of the physical communication channel between the device interface and the second devices has changed from connected to disconnected; and
in response to determining that the trigger event has occurred, synchronize the first clock based on the triggering event, wherein the second device responds to the triggering event by synchronizing the second clock of the second device.

12. The electronic device of claim 9, wherein the controller enables the electronic device to:
transmit the out-of-band frame sync signal over an OTA communication channel to: (i) wake up the second device; (ii) prompt the second device to reconnect with the first device; and (iii) synchronize time with the electronic device and the second device for reduced latency in transmitting output data that will be subsequently received in the queue.

13. The electronic device of claim 9, wherein the controller enables the electronic device to:
monitor, by the first device, for the output data present in a queue on the first device, the output data being selected for presentation on the output device of the second device;
in response to determining that the output data is present in the queue, transmit the out-of-band frame sync signal by the first device to the second device to prompt the second device to wake up and to synchronize time with the first device;
reconnect via the in-band OTA communication session, the first device to the second device.

14. The electronic device of claim 9, wherein the controller enables the electronic device to encode, by the first device, the preset timing, frequency and connection parameters with the asynchronous frame sync signal during wireless connection between the first and second devices.

15. The electronic device of claim 9, wherein the controller enables the electronic device to access to the preset timing, frequency and connection parameters for wireless connection between the first and second devices with reduced connection latency.

16. The electronic device of claim 9, wherein the user output device comprises at least one of: (i) a display; and (ii) an audio speaker.

17. The electronic device of claim 9, wherein the controller enables the electronic device to:
receive, by the first device, an out-of-band frame sync signal from the second device;
synchronize the first clock of the first device to the second clock of the second device in response to receiving the out-of-band frame sync signal from the second device;
establish an in-band OTA communication session that is expedited by the out-of-band frame sync signal; and receive output data, via the in-band OTA communication session, by the first device from the second device; and present the output data from the second device on a first user output device of the first device.

18. A computer program product comprising:

a computer readable storage device; and program code on the computer readable storage device that when executed by a processor associated with a first device, the program code enables the first device to provide the functionality of:

comparing, by the first device, a time threshold to an amount of time that has elapsed since the respective first and second clocks of the first and second device were synchronized;

in response to determining that the amount of elapsed time exceeds the time threshold, transmitting an out-of-band frame sync signal by a first device to a second device to prompt the second device to synchronize second clock of the second device with a first clock of the first device and to one of: (i) connect; and (ii) reconnect an over-the-air (OTA) communication session between the second device and the first device, the out-of-band frame sync signal enabling faster connection/reconnection than a set interval of a Bluetooth (BT) sniff mode;

establishing the in-band OTA communication session between the second device and the first device, a timing for establishing the in-band OTA communication session expedited by the out-of-band frame sync signal; and transmitting output data, via the in-band OTA session, by the first device to the second device to present the output data on a second user output device of the second device.

19. The computer program product of claim 18, wherein the program code enables the first device to provide the functionality of:

transmitting the out-of-band frame sync signal via a physical communication channel from the first device to the second device;

determining whether a trigger event has occurred, the trigger event being a status of the physical communication channel between the first and second devices having changed from connected to disconnected; and in response to determining that the trigger event has occurred, synchronizing the first clock based on the triggering event, wherein the second device responds to the triggering event by synchronizing the second clock of the second device.

20. The computer program product of claim 18, wherein the transmitting of the out-of band signal is completed via a physical communication channel between the first and second device, and the program code comprises code that enables the first device to provide the functionality of:

determining, by the first and second devices, whether a trigger event has occurred, the trigger event being a status of the physical communication channel between the first and second devices having changed from connected to disconnected; and in response to determining that the trigger event has occurred, synchronizing, by the first and second devices, the respective first and second clocks based on the triggering event.

* * * * *